United States Patent
Ince

(10) Patent No.: US 10,451,120 B2
(45) Date of Patent: Oct. 22, 2019

(54) THREE-WAY SWITCHABLE CLUTCH

(71) Applicant: Schaeffler Technologies AG & Co. KG, Herzogenaurach (DE)

(72) Inventor: Marion Jack Ince, Mount Holly, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 273 days.

(21) Appl. No.: 15/464,383

(22) Filed: Mar. 21, 2017

(65) Prior Publication Data
US 2018/0274604 A1   Sep. 27, 2018

(51) Int. Cl.
| F16D 41/07 | (2006.01) |
| F16D 41/08 | (2006.01) |
| F16D 41/06 | (2006.01) |
| F16D 41/12 | (2006.01) |
| F16D 41/16 | (2006.01) |
| F16D 41/063 | (2006.01) |

(52) U.S. Cl.
CPC ......... *F16D 41/082* (2013.01); *F16D 41/063* (2013.01)

(58) Field of Classification Search
CPC ...... F16D 41/073; F16D 41/082; F16D 41/06; F16D 41/12; F16D 41/16
See application file for complete search history.

(56) References Cited

U.S. PATENT DOCUMENTS

| 2,844,050 | A | * | 7/1958 | Ludwig | B62M 11/14 |
| | | | | | 192/64 |
| 5,025,902 | A | * | 6/1991 | Imai | B60K 17/26 |
| | | | | | 180/249 |
| 5,971,123 | A | * | 10/1999 | Ochab | F16D 27/10 |
| | | | | | 192/38 |
| 5,992,592 | A | | 11/1999 | Showalter | |
| 6,109,410 | A | | 8/2000 | Costin | |
| 6,739,440 | B1 | | 5/2004 | Dick | |
| 8,042,670 | B2 | * | 10/2011 | Bartos | F16D 41/16 |
| | | | | | 192/43.1 |
| 10,173,525 | B2 | * | 1/2019 | Kamitani | B60K 23/04 |
| 2006/0021835 | A1 | | 2/2006 | Kimes et al. | |
| 2007/0278061 | A1 | * | 12/2007 | Wittkopp | F16D 41/16 |
| | | | | | 192/43.1 |
| 2008/0169166 | A1 | | 7/2008 | Wittkopp et al. | |

(Continued)

FOREIGN PATENT DOCUMENTS

WO   2016168070 A1   10/2016

*Primary Examiner* — Tinh T Dang

(57) ABSTRACT

A three-way switchable clutch, including: outer and inner rings; and pawls non-rotatably connected to the outer ring. For a free-wheel mode, the inner and outer rings are rotatable with respect to each other. For first and second clutch modes, the pawls are displaceable to engage the inner ring to non-rotatably connect the inner and outer rings. For the first mode: rotation of one of the inner or outer rings is in a first circumferential directions and the one of the inner or outer rings is rotatable with respect to the other of the inner or outer ring in a second circumferential direction. For the second mode: rotation of the one of the inner or outer rings is in the second circumferential direction and the one of the inner or outer rings is rotatable with respect to the other of the inner or outer rings in the first circumferential direction.

15 Claims, 12 Drawing Sheets

(56) References Cited

U.S. PATENT DOCUMENTS

| | | |
|---|---|---|
| 2008/0223681 A1 | 9/2008 | Stevenson et al. |
| 2009/0266667 A1* | 10/2009 | Samie ................... F16D 41/12 192/43.1 |
| 2010/0122883 A1 | 5/2010 | Bartos et al. |
| 2015/0083539 A1 | 3/2015 | Lee et al. |
| 2015/0176662 A1 | 6/2015 | Lee et al. |
| 2018/0172088 A1* | 6/2018 | Peglowski .............. F16D 41/04 |

* cited by examiner

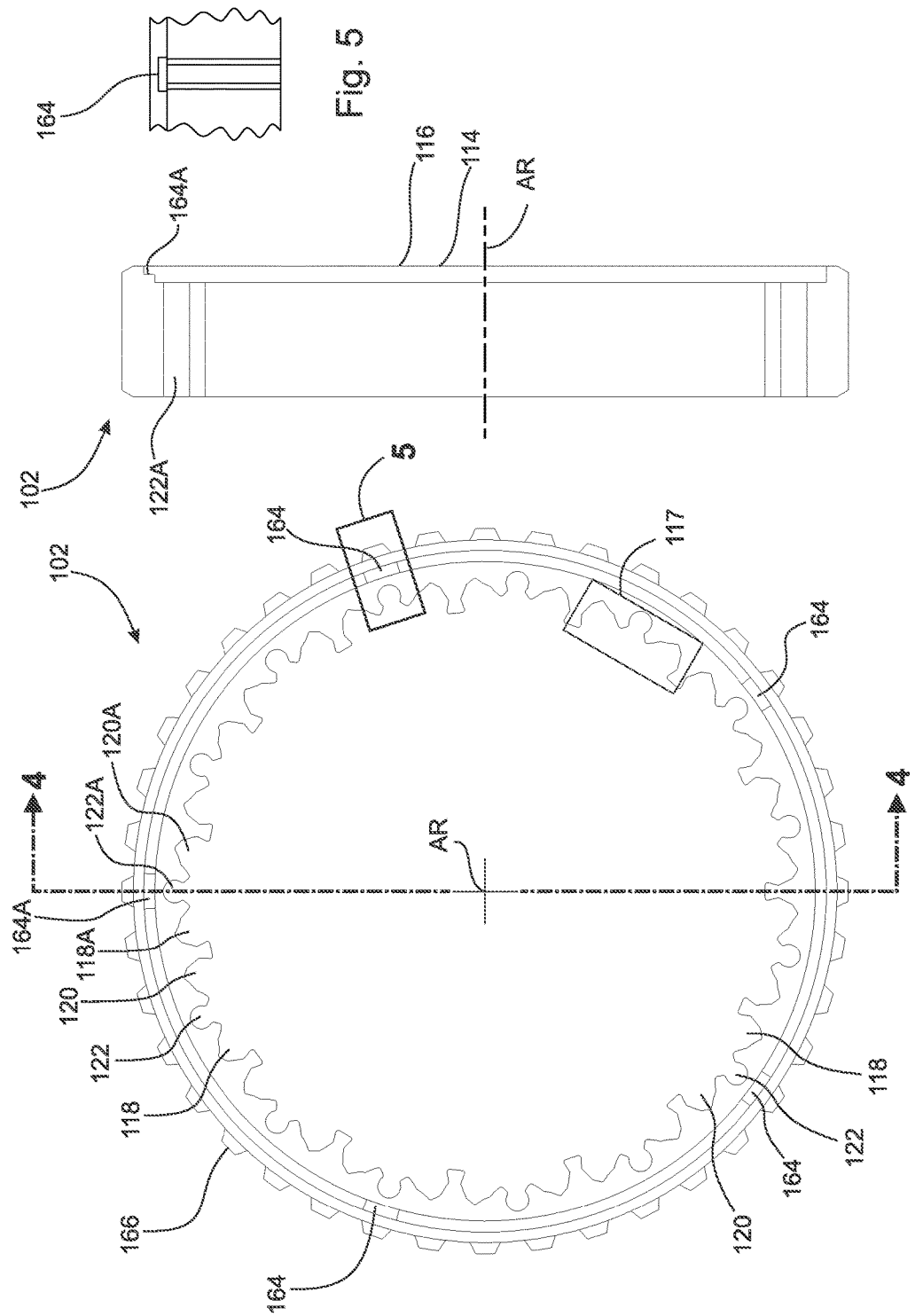

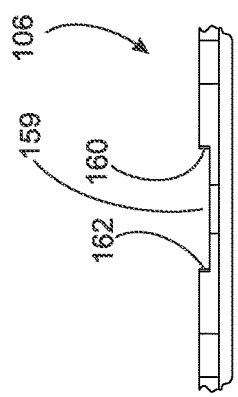
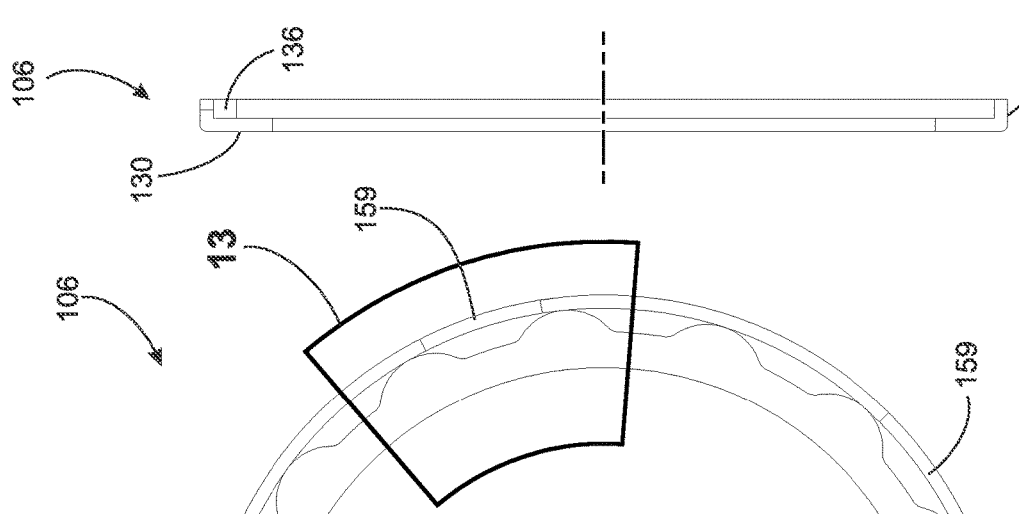
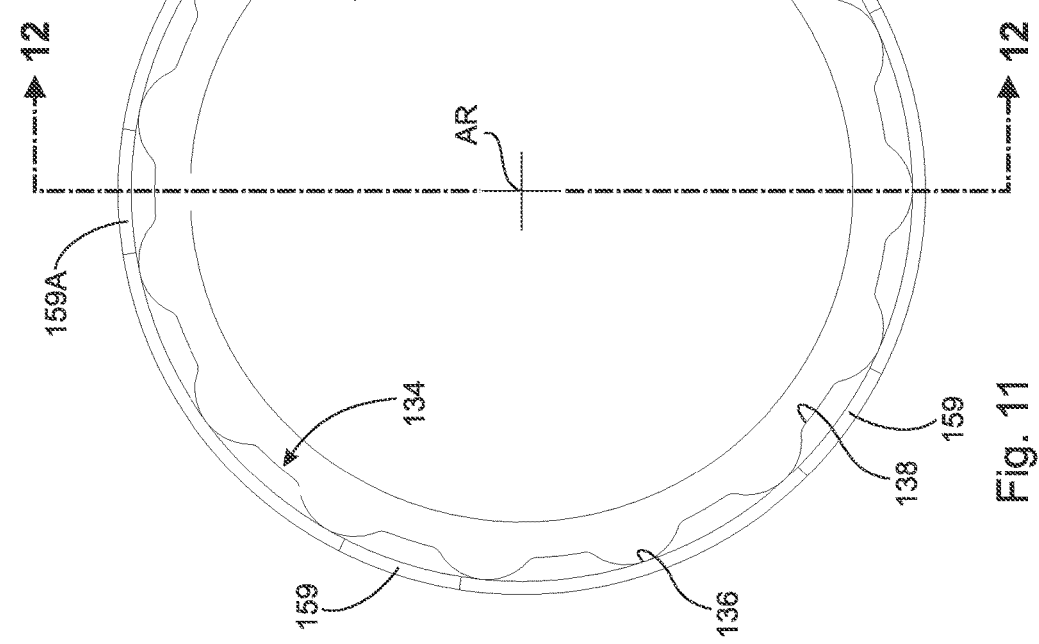

THREE-WAY SWITCHABLE CLUTCH

TECHNICAL FIELD

The present disclosure relates to a three-way switchable clutch, in particular a clutch with at least the following selectable modes: free-wheel, one-way operation in one circumferential direction, and one-way operation in an opposite circumferential direction.

BACKGROUND

Radial one-way clutches having inner and outer rings are known. However, known configurations of these clutches are typically limited to free-wheel operation in one circumferential direction and one-way operation in an opposite circumferential direction.

SUMMARY

According to aspects illustrated herein, there is provided a three-way switchable clutch, including: an axis of rotation; an outer ring; an inner ring located radially inward of the outer ring; and a plurality of pawls non-rotatably connected to the outer ring. For a free-wheel mode the inner and outer rings are rotatable with respect to each other. For a first clutch mode: each pawl is displaceable to engage the inner ring to non-rotatably connect the inner and outer rings, for rotation of one of the inner or outer ring, in a first circumferential direction; and the one of the inner or outer ring is rotatable, with respect to the other of the inner or outer ring, in a second circumferential direction, opposite the first circumferential direction. For a second clutch mode: said each pawl is displaceable to engage the inner ring to non-rotatably connect the inner and outer rings, for rotation of the one of the inner or outer ring, in the second circumferential direction; and the one of the inner or outer ring is rotatable, with respect to the other of the inner or outer ring, in the first circumferential direction.

According to aspects illustrated herein, there is provided a three-way switchable clutch, including: an axis of rotation; an outer ring; an inner ring located radially inwardly of the outer ring; a selector ring located radially between the inner and outer rings; a wave spring non-rotatably connected to the selector ring; and a plurality of pawls. Each pawl includes first and second circumferential ends and is engaged with the wave spring. For a free-wheel circumferential position of the selector ring, the inner ring and outer rings are rotatable with respect to each other. For a first circumferential position of the selector ring: the wave spring is arranged is displace the first circumferential ends radially inwardly to contact the inner ring and non-rotatably connect the inner and outer rings for rotation of the inner ring in a first circumferential direction; and the inner ring is rotatable, with respect to the outer ring, in a second circumferential direction, opposite the first circumferential direction. For a second circumferential position of the selector ring: the wave spring is arranged is displace the second circumferential ends radially inwardly to contact the inner ring and non-rotatably connect the inner and outer rings for rotation of the inner ring in the second circumferential direction; and the inner ring is rotatable, with respect to the outer ring, in the first circumferential direction.

According to aspects illustrated herein, there is provided a three-way switchable clutch, including: an axis of rotation; an outer ring; an inner ring located radially inwardly of the outer ring; a selector ring located radially between the inner and outer rings; a wave spring non-rotatably connected to the selector ring; and a plurality of pawls. Each pawl includes first and second circumferential ends and is engaged with the wave spring. For a free-wheel circumferential position of the selector ring, the inner ring and outer rings are rotatable with respect to each other. For a first circumferential position of the selector ring: the wave spring is arranged is displace the first circumferential ends radially inwardly to contact the inner ring and non-rotatably connect the inner and outer rings for rotation of the outer ring in a first circumferential direction; and the outer ring is rotatable, with respect to the inner ring, in a second circumferential direction, opposite the first circumferential direction. For a second circumferential position of the selector ring: the wave spring is arranged is displace the second circumferential ends radially inwardly to contact the inner ring and non-rotatably connect the inner and outer rings for rotation of the outer ring in the second circumferential direction; and the outer ring is rotatable, with respect to the inner ring, in the first circumferential direction.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 3 is a front view of the outer ring in FIG. 1;

FIG. 4 is a cross-sectional view generally along line 4-4 in FIG. 3;

FIG. 5 is a view, from axis AR, of area 5 in FIG. 3;

FIG. 11 is a front view of the selector ring in FIG. 1;

FIG. 12-12 is a cross-sectional view generally along line 12-12 in FIG. 11;

FIG. 13 is a view, from axis AR, of area 13 in FIG. 11;

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 16:
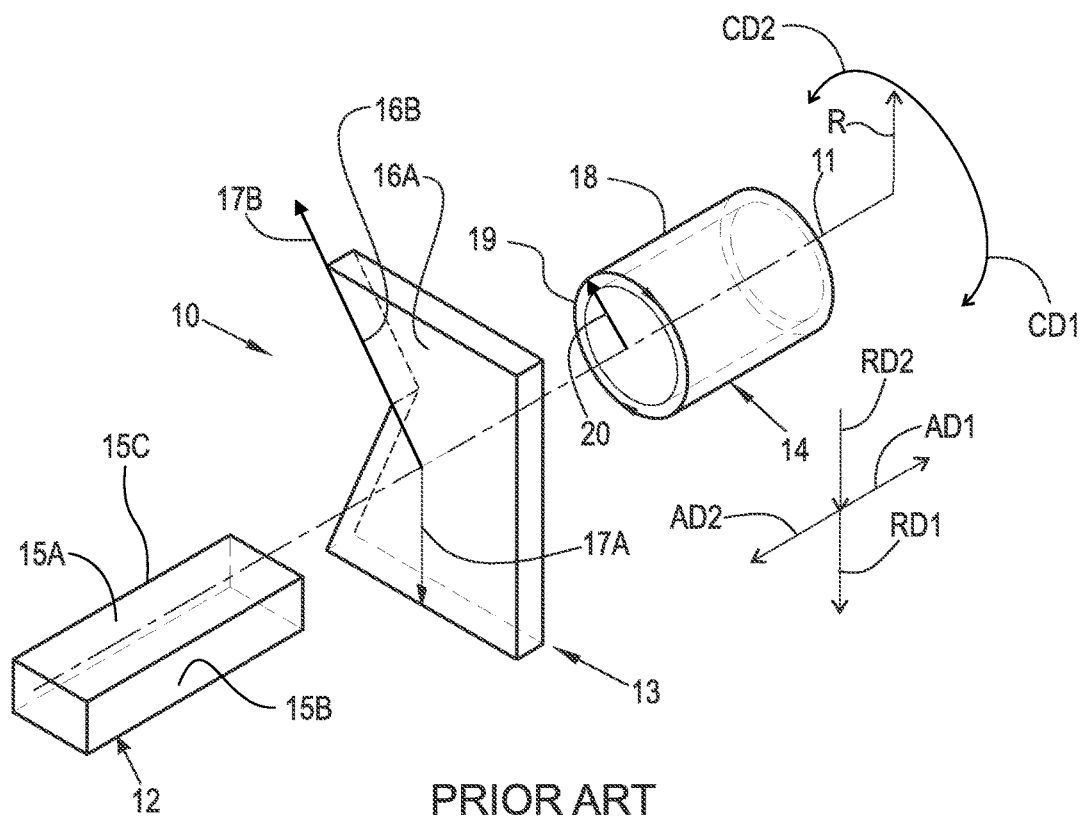

FIG. 16 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in direction axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
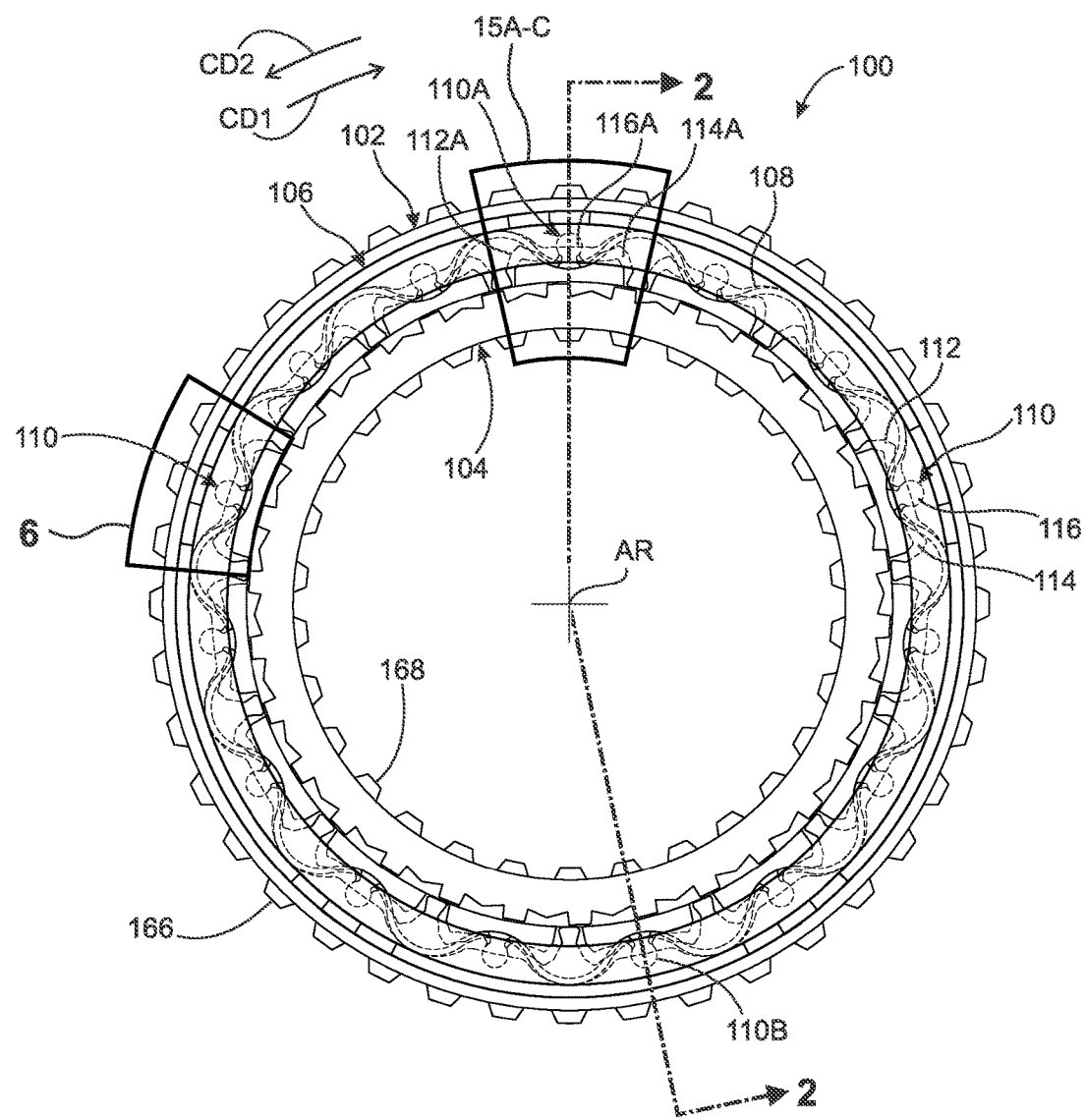
FIG. 1 is a front view of a three-way switchable clutch.

FIG. 1 is a front view of three-way switchable clutch 100.

Figure 2:
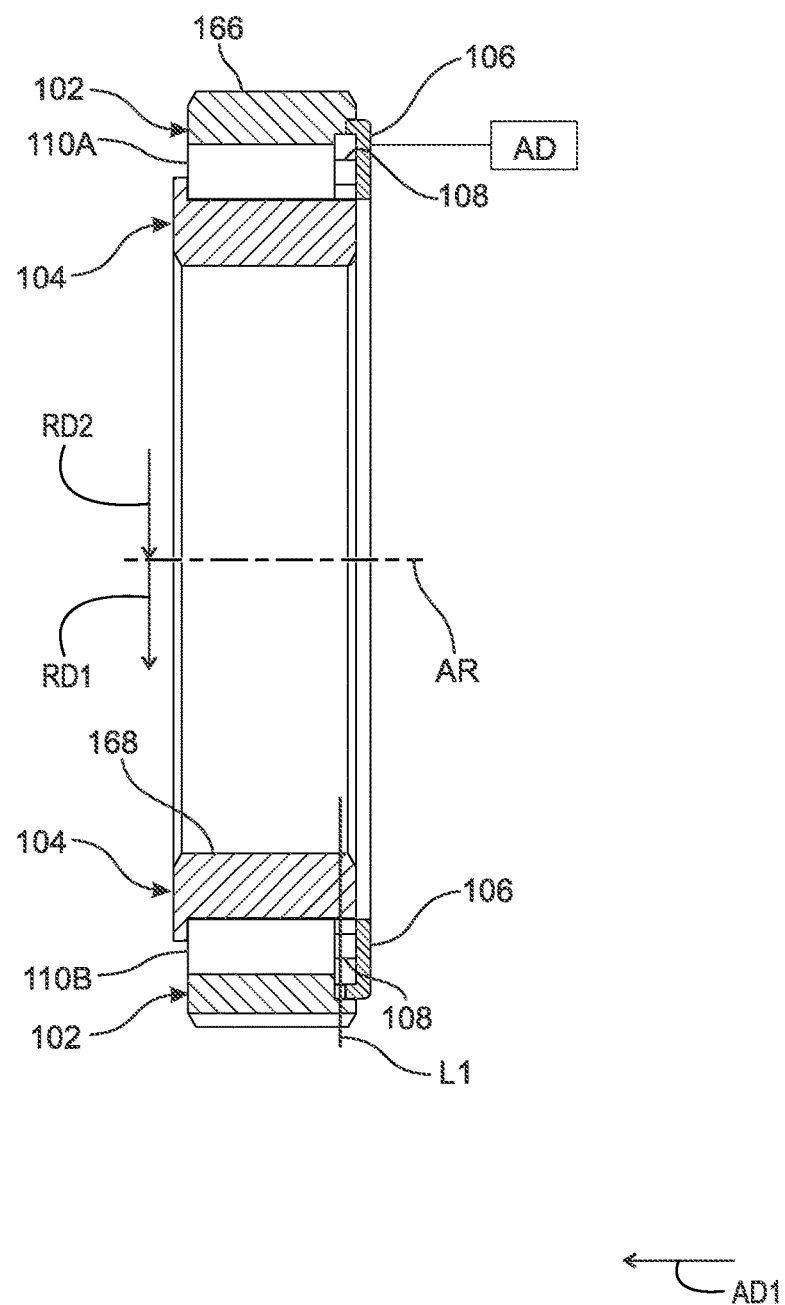
FIG. 2 is a cross-sectional view generally along line 2-2 in FIG. 1.

FIG. 2 is a cross-sectional view generally along line 2-2 in FIG. 1. The following should be viewed in light of FIGS. 1 and 2. Three-way switchable clutch 100 includes: axis of rotation AR; outer ring 102; inner ring 104; selector ring 106; wave spring 108; and pawls 110. At least respective portions of rings 104 and 106 are located radially inward of outer ring 102. Ring 106 is located radially between rings 102 and 104. Spring 108 is non-rotatably connected to ring 106. Pawls 110 are connected to outer ring 102.

The discussion that follows assumes that ring 104 receives torque for transmission to ring 102 as further detailed below. For a free-wheel mode of clutch 100: inner ring 104 is rotatable with respect to outer ring 102 in opposite circumferential directions CD1 and CD2; or outer ring 102 is rotatable with respect to inner ring 104 in circumferential directions CD1 and CD2.

Portions of the discussion below are directed to single example pawls 110A and 110B. However, it should be understood that the respective discussions for pawl 110A and 110B are applicable to each pawl 110 in clutch 100 unless noted otherwise. In the discussion that follows, capital letters are used to designate a specific component from a group of components otherwise designated by a three digit number, for example, in the discussion below, pawl 110A is a specific example from pawls 110. In an example embodiment, line L1, orthogonal to axis AR, passes through, in sequence: inner ring 104; a pawl 110, for example pawl 110B, wave spring 108; selector ring 106; and outer ring 102.

For a first clutch, or one-way clutch, mode of clutch 100, pawls 110 are engaged with inner ring 104 to non-rotatably connect inner ring 104 with outer ring 102 for rotation of ring 104 in circumferential direction CD1. For the first clutch mode, inner ring 104 is rotatable, with respect to outer ring 102, in circumferential direction CD2. For a second clutch, or one-way clutch, mode of clutch 100, pawls 110 are engaged with inner ring 104 to non-rotatably connect inner ring 104 with outer ring 102 for rotation of ring 104 in circumferential direction CD2. For the second clutch mode, inner ring 104 is rotatable, with respect to outer ring 102, in circumferential direction CD1.

By "non-rotatably connected" elements, we mean that: the elements are connected so that whenever one of the elements rotates, all the elements rotate; and relative rotation between the elements is not possible. Radial and/or axial movement of non-rotatably connected elements with respect to each other is possible, but not required.

To shift from the second clutch mode to the free-wheel mode, or from the free-wheel mode to the first clutch mode, selector ring 106 is arranged to displace in circumferential direction CD2 with respect to outer ring 102 and pawls 110. As a result, ring 106 displaces spring 108 in circumferential direction CD2 with respect to outer ring 102 and pawls 110. To shift from the first clutch mode to the free-wheel mode, or from the free-wheel mode to the second clutch mode, selector ring 106 is arranged to displace in circumferential direction CD1 with respect to outer ring 102 and pawls 110. As a result, ring 106 also displaces spring 108 in circumferential direction CD1 with respect to outer ring 102 and pawls 110.

Each pawl 110 includes: circumferential ends 112 and 114; and head portion 116. Portion 116 is circumferentially disposed between ends 112 and 114 and is radially and circumferentially fixed with respect to ring 102. End 112 extends furthest in circumferential direction CD2. That is, end 112 includes the portion of pawl 110 extending furthest in circumferential direction CD2. End 114 extends furthest in circumferential direction CD1. That is, end 114 includes the portion of pawl 110 extending furthest in circumferential direction CD1. For the first clutch mode: wave spring 108 is arranged to urge ends 112 radially inward in direction RD2; and for rotation of inner ring 104, with respect to ring 102, in circumferential direction CD1, ends 112 are arranged to contact inner ring 104. For the second clutch mode: wave spring 108 is arranged to urge ends 114 radially inward in direction RD2; and for rotation of inner ring 104, with respect to ring 102, in circumferential direction CD2, ends 114 are arranged to contact inner ring 104.

FIG. 3 is a front view of outer ring 102 in FIG. 1.

FIG. 4 is a cross-sectional view generally along line 4-4 in FIG. 3.

FIG. 5 is a view, radially outward from axis AR, of area 5 in FIG. 3.

Figure 6:
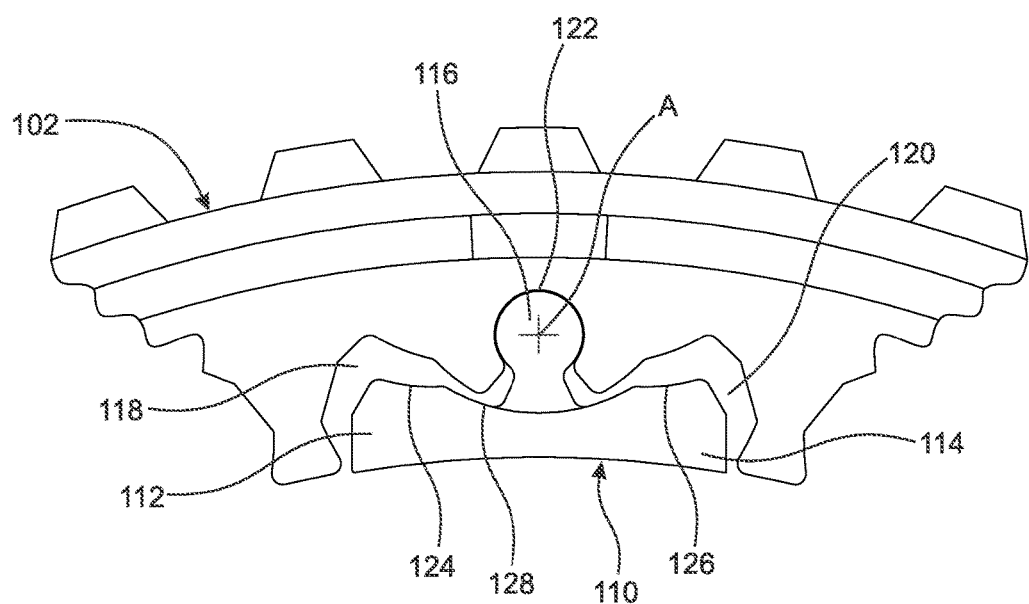
FIG. 6 is a front view of area 6 in FIG. 1, with a radially extending body portion of the selector ring removed, showing a pawl in the free-wheel mode.

FIG. 6 is a front view of area 6 in FIG. 1, with a radially extending body portion of selector ring 106 removed, showing a pawl in the free-wheel mode. The following should be viewed in light of FIGS. 1 through 6. In an example embodiment, outer ring 102 includes slot groups 117. Each group 117 includes slots 118, 120, and 122 facing radially inward. Slot 122 is circumferentially disposed between slots 118 and 120. Each head portion 116 is disposed in a respective slot 122. For example, head portion 116A of pawl 110A is disposed in slot 122A. Each pawl 110 is pivotable, with respect to outer ring 102, about axis A, parallel to axis AR and passing through head portion 116. Using pawl 110 in FIG. 6 as an example, for the first clutch mode, wave spring 108 is arranged to pivot pawl 110 counterclockwise about axis A to displace ends 114 radially outwardly into slots 120. Using pawl 110 in FIG. 6 as an example, for the second clutch mode, wave spring 108 is arranged to pivot pawl 110 clockwise about axis A to displace ends 112 radially outwardly into slots 118.

Figure 7:
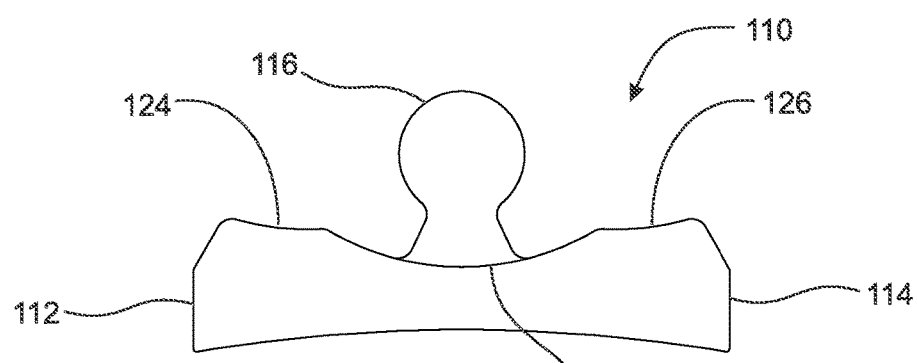
FIG. 7 is a front view of a pawl in FIG. 1.

FIG. 7 is a front view of a typical pawl 110 in FIG. 1.

Figure 8:
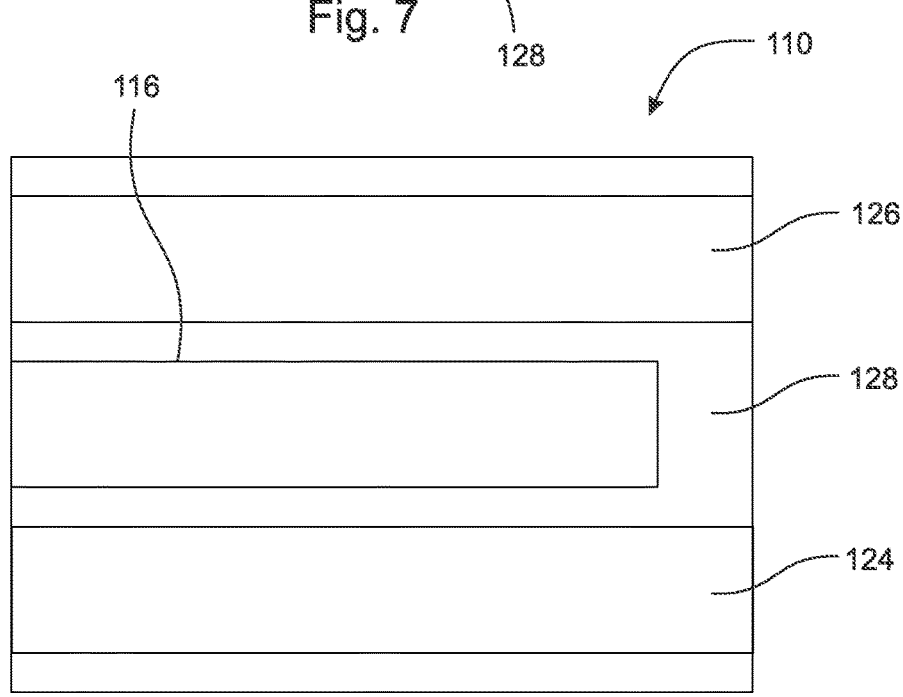
FIG. 8 is a top view of the pawl in FIG. 7.

FIG. 8 is a top view of pawl 110 in FIG. 7.

Figure 9:
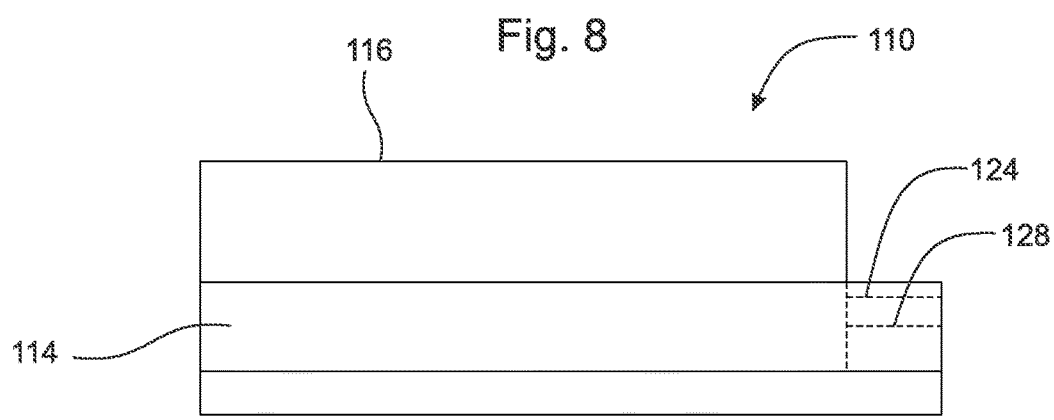
FIG. 9 is a side view of the pawl in FIG. 7.

FIG. 9 is a side view of pawl 110 in FIG. 7. The following should be viewed in light of FIGS. 1 through 9. In an example embodiment, each pawl 110 includes grooves 124, 126, and 128. Groove 128 is circumferentially disposed between grooves 124 and 126. Groove 124 is circumferentially disposed between end 112 and groove 128. Groove 126 is circumferentially disposed between end 114 and groove 128.

Figure 10:
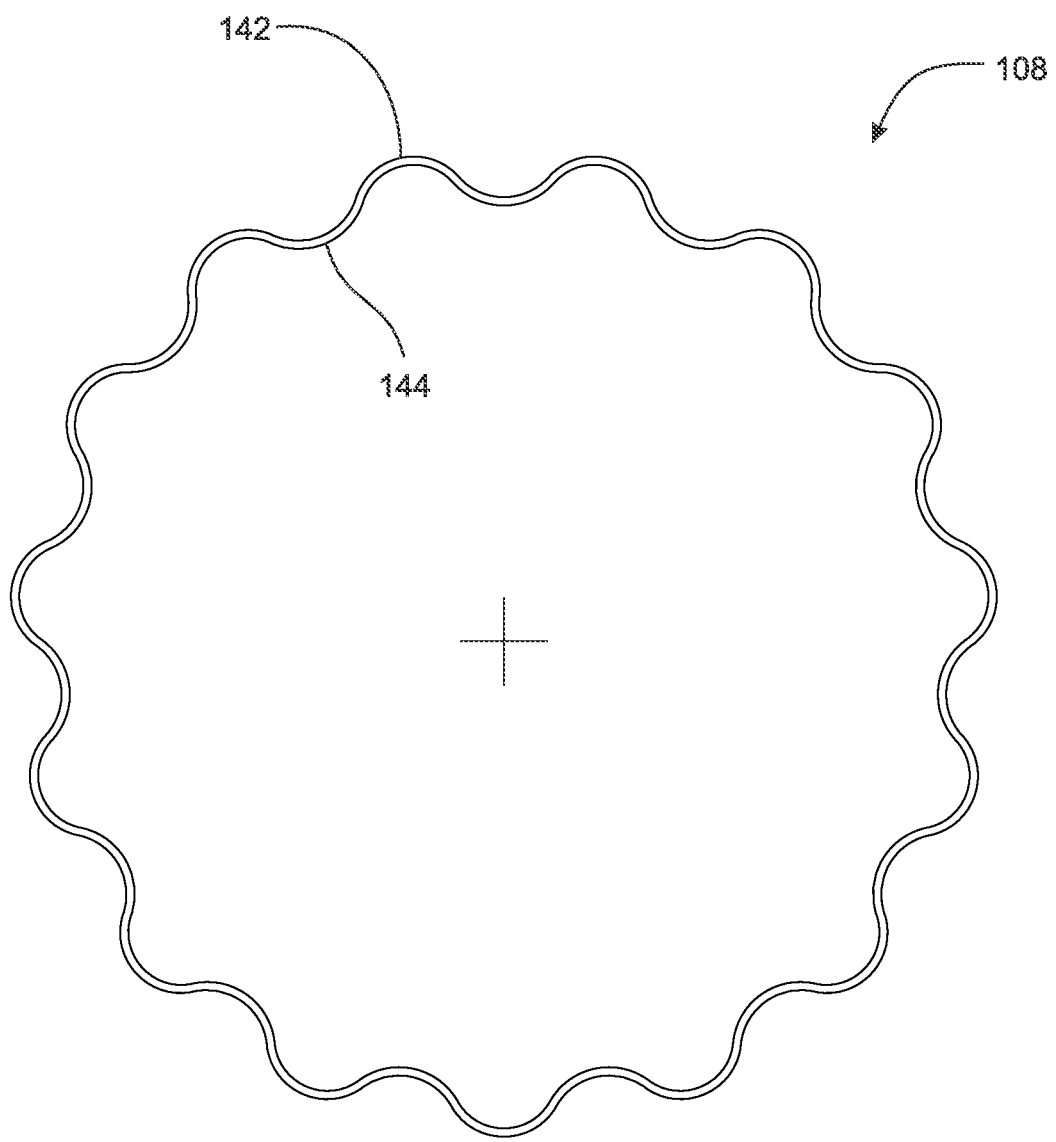
FIG. 10 is a front view of the wave spring in FIG. 1.

FIG. 10 is a front view of wave spring 108 in FIG. 1.

FIG. 11 is a front view of selector ring 106 in FIG. 1.

FIG. 12 is a cross-sectional view generally along line 12-12 in FIG. 11.

FIG. 13 is a view, from axis AR, of area 13 in FIG. 11. The following should be viewed in light of FIGS. 1 through 13. Ring 106 includes radially extending body portion 130 and flange 132 extending axially from portion 130. In the example of FIG. 1, flange 132 extends in axial direction AD1 from portion 130. Ring 106 includes radially inwardly facing surface 134 including scallops, or radially outwardly extending indentations, 136 circumferentially interleaved with portions 138. At least segments of portions 138 are radially closer to axis AR than indentations 136. Radially outermost portions 142 of spring 108 are disposed in respective indentations 136. Portions 138 circumferentially fix spring 108 with respect to ring 106.

For the free-wheel mode, radially innermost portions 144 of wave spring 108 are disposed in respective grooves 128. For the first clutch mode, portions 144 are disposed in respective grooves 124. For the second clutch mode, portions 144 are disposed in respective grooves 126.

Selector ring 106 is rotatable, or circumferentially displaceable, among a free-wheel circumferential position, a first circumferential position, and a second circumferential position, associated with the free-wheel mode, the first clutch mode, and the second clutch mode, respectively, of clutch 100. Thus, ring 106 is circumferentially displaceable to circumferentially displace spring 108 (spring 108 is non-rotatably connected to ring 106) to select from among the free-wheel, first clutch, and second clutch modes. To shift from the first clutch mode to the free-wheel or second clutch mode, selector ring 106 is arranged to displace spring 108 in circumferential direction CD1, with respect to outer ring 102, and portions 144 are shifted to grooves 128 or 126, respectively. To shift from the second clutch mode to the free-wheel or first clutch mode, selector ring 106 is arranged to displace spring 108 in circumferential direction CD2, with respect to outer ring 102, and portions 144 are shifted to grooves 128 or 124, respectively. To shift from the free-wheel mode to the first or second clutch mode, selector ring 106 is arranged to displace spring 108 in circumferential direction CD2 or CD1, respectively, with respect to outer ring 102, and portions 144 are shifted to grooves 124 or 126, respectively.

Figure 14:
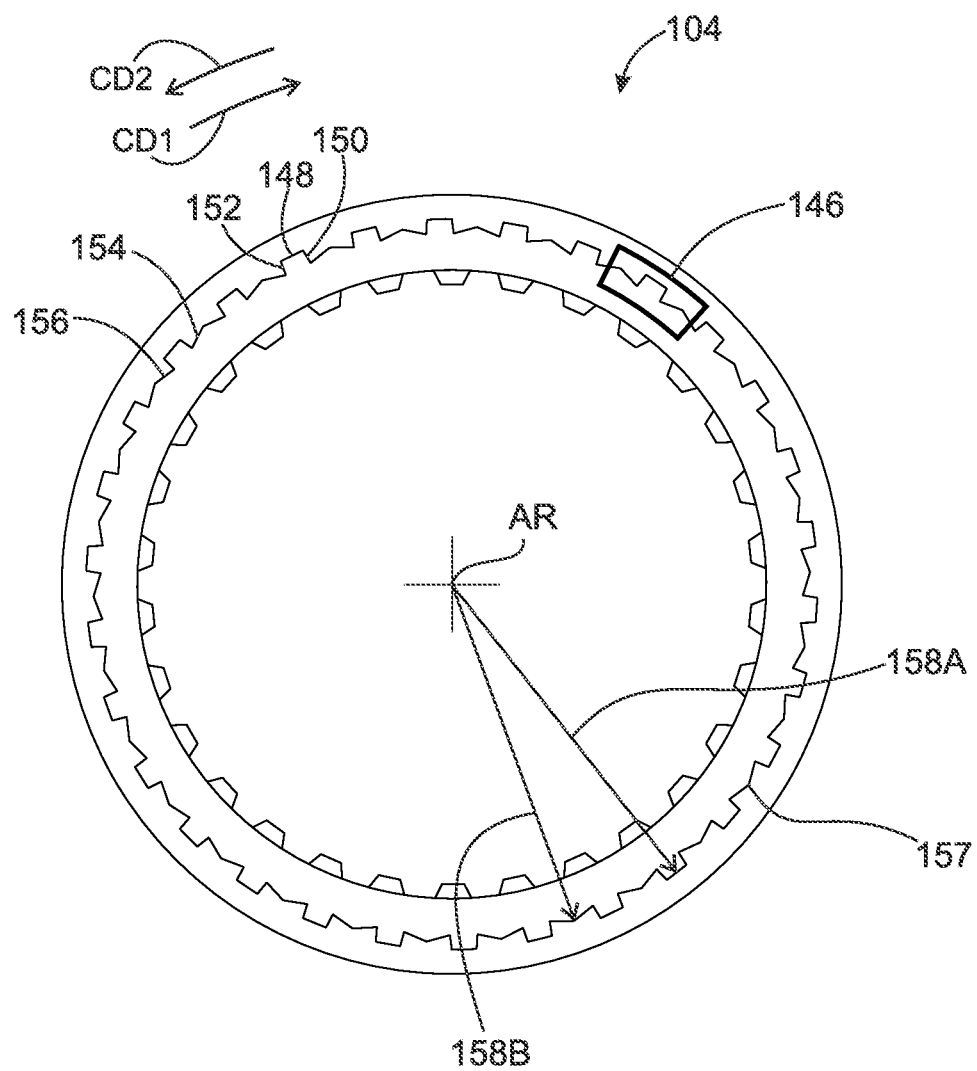
FIG. 14 is a front view of the inner ring in FIG. 1.

FIG. 14 is a front view of inner ring 104 in FIG. 1. The following should be viewed in light of FIGS. 1 through 15. Ring 104 includes locking ramp groups 146. Each group 146 includes: radially outermost surface 148; blocking surfaces 150 and 152; and ramps 154 and 156. Surfaces 150 and 152 extend radially inwardly from surface 148. Ramp 154 slopes radially outwardly from surface 150 in circumferential direction CD2. Ramp 156 slopes radially outwardly from surface 152 in circumferential direction CD1. In an example embodiment, circumferentially adjacent ramps 154 and 156 are directly connected at point 157. In an example embodiment, radial distance 158A from axis AR to surface 148 is greater than radial distance 158B from axis AR to point 157.

In an example embodiment: selector ring 106 includes at least one notch 159 with circumferential ends 160 and 162; and ring 102 includes at least one stop, or protrusion, 164 located in notch 159. Notch 159 is displaceable with respect to stop 164. As further described below, notch 159 contacts stop 164 to block, or limit, rotation of ring 106 with respect to ring 104.

Figure 15A:
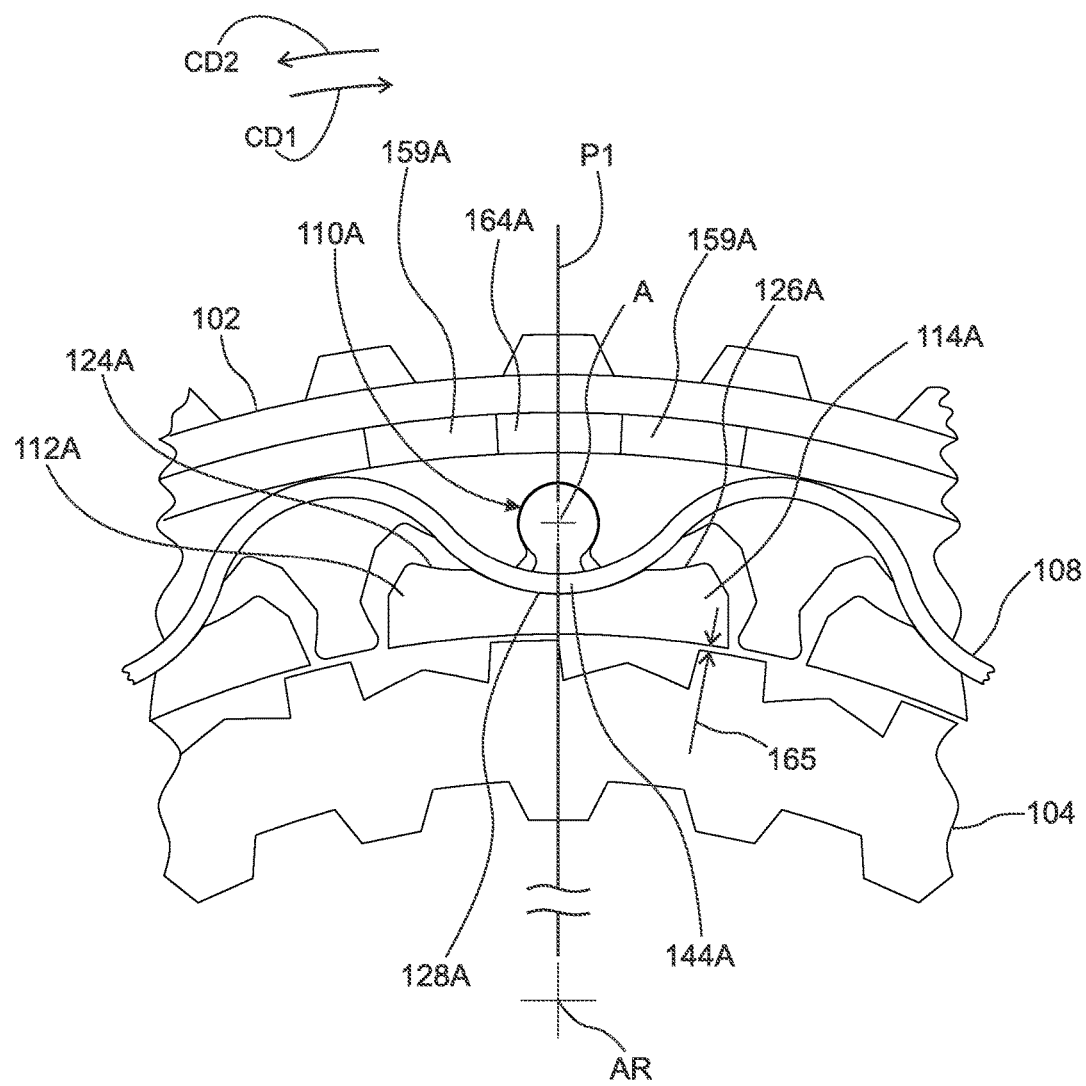
FIG. 15A is a front view of area 15A-C in FIG. 1, with the radially extending body portion of the selector ring removed, in a free-wheel mode.

FIG. 15A is a front view of area 15A-C in FIG. 1, with radially extending body portion 130 of selector ring 106 removed, in a free-wheel mode. The following should be viewed in light of FIGS. 1 through 15A. For the free-wheel mode, ring 106 and spring 108 are positioned, with respect to outer ring 104, so that portions 144 of spring 108 are disposed in respective grooves 128 of pawls 110. For example, portion 144A is disposed in groove 128A. For example, plane P1, is co-linear with axis AR, and passes through portion 144A, groove 128A, axis A for pawl 110A, notch 159A and stop 164A. Portion 144A is circumferentially centered between ends 112A and 114A and does not tip pawl 110A. That is, neither of ends 112A or 114A is urged radially inwardly. Since pawls 110 are not lockingly engaged with inner ring 104, rings 102 and 104 are rotatable with respect to each other. Stop 164A is circumferentially disposed between circumferential ends 160 and 162. In an example embodiment, in the free-wheel mode, pawls 110 are free of contact with inner ring 104, for example, gaps 165 are present between pawls 110 and surfaces 148.

Figure 15B:
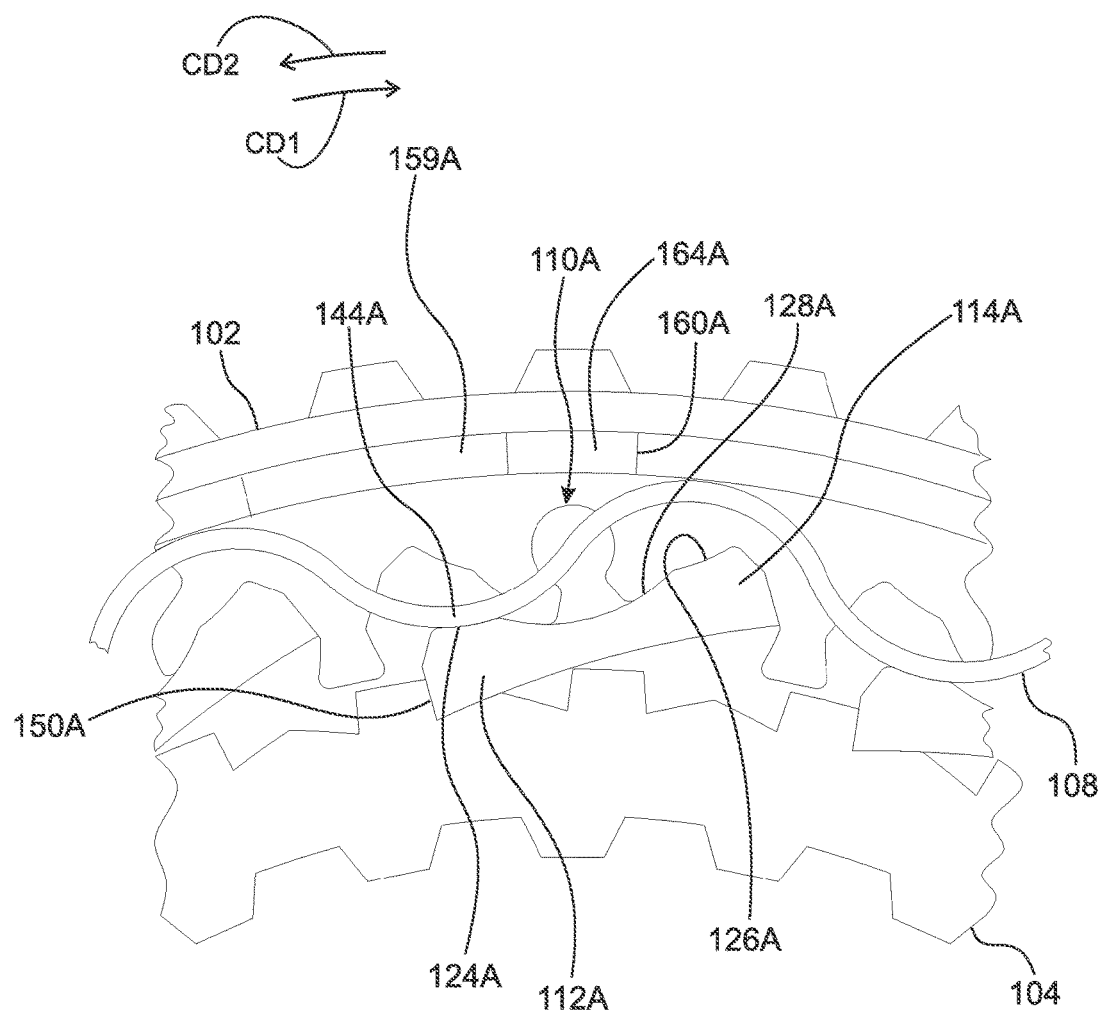
FIG. 15B is a front view of area 15A-C in FIG. 1, with the radially extending body portion of the selector ring removed, in a first clutch mode.

FIG. 15B is a front view of area 15A-C in FIG. 1, with radially extending body portion 130 of selector ring 106 removed, in the first clutch mode. The following should be viewed in light of FIGS. 1 through 15B. In the example of FIG. 15B, for the first clutch mode, pawls 110, in particular ends 112, are arranged to contact respective blocking surfaces 150 for rotation of inner ring 104, with respect to ring 102, in circumferential direction CD1. For example, to transition from the configuration of FIG. 15A to the configuration of FIG. 15B, selector ring 106 and spring 108 are rotated, with respect to ring 102 and pawls 110, in circumferential direction CD2. As a result, portions 144 of spring 108 are disposed in respective grooves 124, and ends 112 are urged radially inwardly. For example, portion 144A is disposed in groove 124A and end 112A is urged radially inwardly.

Rotation of ring 104, with respect to ring 102, in direction CD1 brings ends 112 into contact with surfaces 150. For example, end 112A is in contact with surface 150A. Stop 164A has contacted end 160A to prevent ring 106 from over rotating into the free-wheel or second clutch mode. That is, when stops 164 contact ends 160, portions 144 are located in respective grooves 124, ensuring proper implementation of the first clutch mode. In an example embodiment, for rotation of ring 104 in direction CD1, ends 112 are tipped into contact with ramps 154 and slide down ramps 154 to contact surfaces 150. Radially inner force from spring 108 keeps ends 112 in contact with surfaces 150. In an example embodiment, for rotation of ring 104 in circumferential direction CD2, ends 112 slide up ramps 154 and over surfaces 148.

Figure 15C:
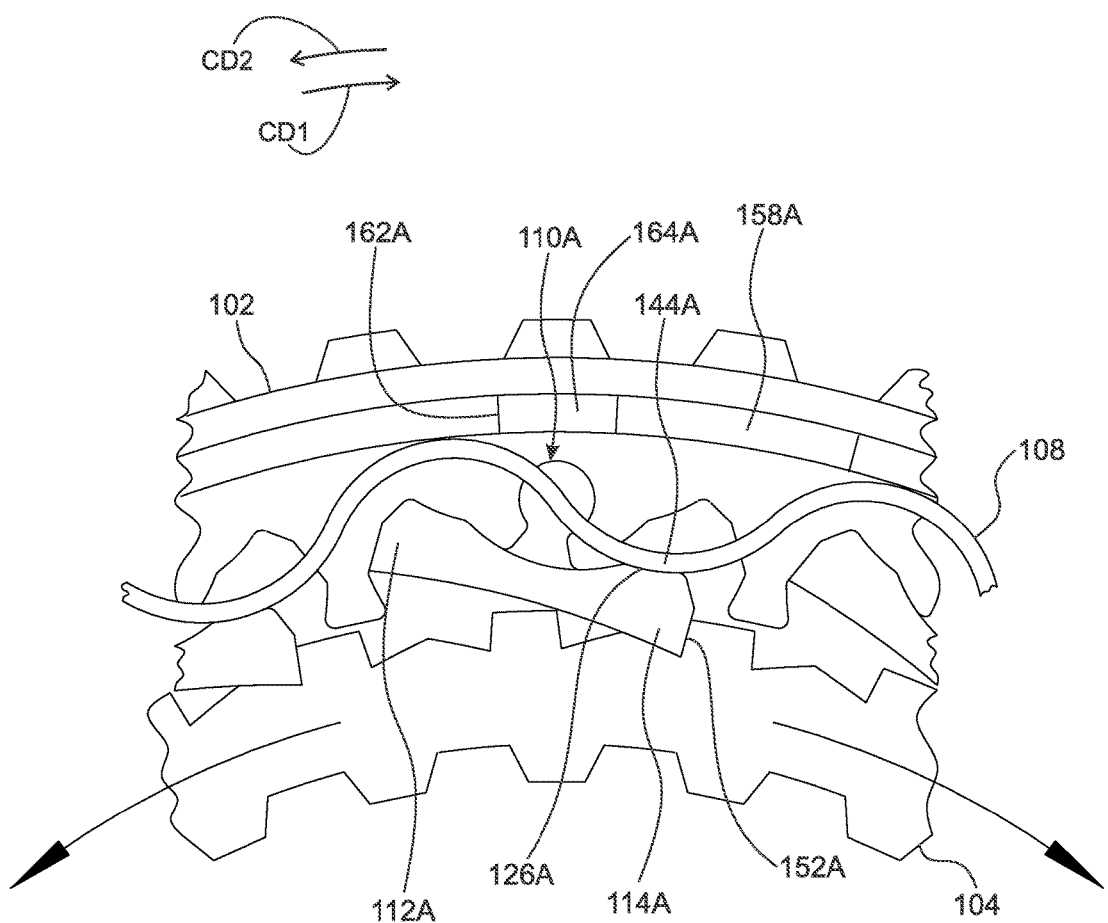
FIG. 15C is a front view of area 15A-C in FIG. 1, with the radially extending body portion of the selector ring removed, in a second clutch mode; and, FIG. 16 is a perspective view of a cylindrical coordinate system demonstrating spatial terminology used in the present application.

FIG. 15C is a front view of area 15A-C in FIG. 1, with radially extending body portion 130 of selector ring 106 removed, in the second clutch mode. The following should be viewed in light of FIGS. 1 through 15C. In the example of FIG. 15C, for the second clutch mode, pawls 110, in particular ends 114, are arranged to contact respective blocking surfaces 152 for rotation of inner ring 104, with respect to ring 102, in circumferential direction CD2. To transition from the configuration of FIG. 15A to the configuration of FIG. 15C, selector ring 106 and spring 108 have been rotated, with respect to ring 102 and pawls 110, in circumferential direction CD1. As a result, portions 144 of spring 108 are disposed in respective grooves 126, and ends 114 are urged radially inward. For example, portion 144A is disposed in groove 126A and end 114A is urged radially inwardly. Rotation of ring 104, with respect to ring 102 in direction CD2, brings ends 114 into contact with surfaces 152. For example, end 114A is in contact with surface 152A. Stop 164A has contacted end 162A to prevent ring 106 from over rotating into the free-wheel or first clutch mode. That is, when stops 164 contact ends 162, portions 144 are located in respective grooves 126, ensuring proper implementation of the second clutch mode.

In an example embodiment, for rotation of ring 104, with respect to ring 102, in direction CD2, ends 114 are tipped into contact with ramps 156 and slide down ramps 156 to contact surfaces 152. Radially inward force from spring 108 keeps ends 114 in contact with surfaces 152. In an example embodiment, for rotation of ring 104, with respect to ring 102, in circumferential direction CD1, ends 114 slide up ramps 156 and over surfaces 148.

In an example embodiment: outer ring 102 includes radially outwardly extending teeth, or splines, 166 arranged to non-rotatably connect to a shaft (not shown); and inner ring 104 includes radially inwardly extending teeth, or splines, 168 arranged to non-rotatably connect to a shaft (not shown). In an example embodiment, clutch 100 includes actuator device AD arranged to controllably rotate ring 106 in directions CD1 and CD2. Device AD can be any device known in the art, including but not limited to a mechanical device, an electric device, an electro-mechanical device, a hydraulic device or a pneumatic device.

Once clutch 100 is in the first or second clutch mode, rings 102 and 104 are non-rotatably connected for rotation of ring 104 in directions CD1 and CD2, respectively. However: to transition from the free-wheel mode or the first clutch mode to the second clutch mode, ring 104 rotates in direction CD1 with respect to ring 102, until ends 112 contact and lock with inner ring 104; and, to transition from the free-wheel mode or the second clutch mode to the second clutch mode, ring 104 rotates in direction CD2 with respect to ring 102, until ends 114 contact and lock with the inner ring.

Advantageously, clutch 100 is controllable to select from a multitude of example operating modes as shown below:

1. The free-wheel mode described above.
2. The first clutch mode described above.
3. The second clutch mode described above.
4. A first grounded clutch mode. Ring 102 is rotationally fixed (grounded); and ring 106 and spring 108 are rotated, with respect to ring 102, to locate portions 144 in respective grooves 126 for pawls 110. Rotation of ring 104 in direction CD2 is blocked by contact of ends 114 with surfaces 152. Ring 104 is free to rotate in direction CD1.
5. A second grounded clutch mode: Ring 102 is rotationally fixed (grounded); and ring 106 and spring 108 are rotated, with respect to ring 102, to locate portions 144 in respective grooves 124 for pawls 110. Rotation of ring 104 in direction CD1 is blocked by contact of ends 112 with surfaces 150. Ring 104 is free to rotate in direction CD2.

The discussion that follows assumes that ring 102 receives torque for transmission to ring 104 as further detailed below. The discussion above for FIGS. 1 through 16C is applicable to the discussion below except as noted. For a free-wheel mode of clutch 100: inner ring 104 is rotatable with respect to outer ring 102 in opposite circumferential directions CD1 and CD2; or outer ring 102 is rotatable with respect to inner ring 104 in circumferential directions CD1 and CD2.

For a first clutch, or one-way clutch, mode of clutch 100, pawls 110 are engaged with inner ring 104 to non-rotatably connect inner ring 104 with outer ring 102 for rotation of ring 102, with respect to ring 104, in circumferential direction CD1. For the first clutch mode, ring 102 is rotatable, with respect to ring 104, in circumferential direction CD2. For a second clutch, or one-way clutch, mode of clutch 100, pawls 110 are engaged with inner ring 104 to non-rotatably connect inner ring 104 with outer ring 102 for rotation of ring 102, with respect to ring 104, in circumferential direction CD2. For the second clutch mode, ring 102 is rotatable, with respect to ring 104, in circumferential direction CD1.

To shift from the free-wheel mode or the second clutch mode to the first clutch mode, selector ring 106 is arranged to displace in circumferential direction CD1 with respect to outer ring 102 and pawls 110. As a result, ring 106 displaces spring 108 in circumferential direction CD1 with respect to outer ring 102 and pawls 110. To shift from the first clutch mode or the free-wheel mode to the second clutch mode, selector ring 106 is arranged to displace in circumferential direction CD2 with respect to outer ring 102 and pawls 110. As a result, ring 106 displaces spring 108 in circumferential direction CD2 with respect to outer ring 102 and pawls 110.

For the first clutch mode: wave spring 108 is arranged to urge ends 114 radially inward in direction RD2; and for rotation of 102, with respect to ring 104, in circumferential direction CD1, ends 114 are arranged to contact inner ring 104. For the second clutch mode: wave spring 108 is arranged to urge ends 112 radially inward in direction RD2; and for rotation of ring 102 in circumferential direction CD2, with respect to ring 104, ends 112 are arranged to contact inner ring 104.

The following should be viewed in light of FIGS. 1 through 6. Using pawl 110 in FIG. 6 as an example, for the first clutch mode, wave spring 108 is arranged to pivot pawl 110 clockwise about axis A to displace ends 112 radially outwardly into slots 118. Using pawl 110 in FIG. 6 as an example, for the second clutch mode, wave spring 108 is arranged to pivot pawl 110 counterclockwise about axis A to displace ends 114 radially outwardly into slots 120.

The following should be viewed in light of FIGS. 1 through 13. For the free-wheel mode, radially innermost portions 144 of wave spring 108 are disposed in respective grooves 128. For the first clutch mode, portions 144 are disposed in respective grooves 126. For the second clutch mode, portions 144 are disposed in respective grooves 124.

To shift from the first clutch mode to the free-wheel or second clutch mode, selector ring 106 is arranged to displace spring 108 in circumferential direction CD2, with respect to outer ring 102, and portions 144 are shifted to grooves 128 or 124, respectively. To shift from the second clutch mode to the free-wheel or first clutch mode, selector ring 106 is arranged to displace spring 108 in circumferential direction CD1, with respect to outer ring 102, and portions 144 are shifted to grooves 128 or 126, respectively. To shift from the free-wheel mode to the first or second clutch mode, selector ring 106 is arranged to displace spring 108 in circumferential direction CD1 or CD2, respectively, with respect to outer ring 102, and portions 144 are shifted to grooves 126 or 124, respectively.

The following should be viewed in light of FIGS. 1 through 15A. For the free-wheel mode, ring 106 and spring 108 are positioned, with respect to outer ring 104, so that portions 144 of spring 108 are disposed in respective grooves 128 of pawls 110. For example, portion 144A is disposed in groove 128A. For example, plane P1, co-linear with axis AR, passes through portion 144A, groove 128A, axis A for pawl 110A, notch 159A and stop 164A. Portion 144A is circumferentially centered between ends 112A and 114A and does not tip pawl 110A. That is, neither of ends 112A or 114A is urged radially inward. Since pawls 110 are not lockingly engaged with inner ring 104, rings 102 and 104 are rotatable with respect to each other. Stop 164A is circumferentially disposed between circumferential ends 160 and 162.

In the example of ring 102 receiving torque, FIG. 15C is in the first clutch mode. The following should be viewed in light of FIGS. 1 through 15A and 15C. In the example of FIG. 15C, for the first clutch mode, pawls 110, in particular ends 114, are arranged to contact respective blocking surfaces 152 for rotation of ring 102, with respect to ring 104, in circumferential direction CD1. For example, to transition from the configuration of FIG. 15A to the configuration of FIG. 15C, selector ring 106 and spring 108 are rotated, with respect to ring 102 and pawls 110, in circumferential direction CD1. As a result, portions 144 of spring 108 are disposed in respective grooves 126, and ends 114 are urged radially inwardly. For example, portion 144A is disposed in groove 126A and end 114A is urged radially inwardly.

Rotation of ring 102, with respect to ring 104, in direction CD1 brings ends 114 into contact with surfaces 152. For example, end 114A is in contact with surface 152A. Stop 164A has contacted end 162A to prevent ring 106 from over rotating into the free-wheel or second clutch mode. That is, when stops 164 contact ends 162, portions 144 are located in respective grooves 126, ensuring proper implementation of the first clutch mode. In an example embodiment, for rotation of ring 102, with respect to ring 104, in direction CD1, ends 114 are tipped into contact with ramps 156 and slide down ramps 156 to contact surfaces 152. Radially inner force from spring 108 keeps ends 114 in contact with surfaces 152. In an example embodiment, for rotation of 102, with respect to ring 104, in circumferential direction CD2, ends 114 slide up ramps 156 and over surfaces 148.

In the example of ring 102 receiving torque, FIG. 15B is in the second clutch mode. The following should be viewed in light of FIGS. 1 through 15C. In the example of FIG. 15B, for the second clutch mode, pawls 110, in particular ends 112, are arranged to contact respective blocking surfaces 150 for rotation of ring 102, with respect to ring 104, in circumferential direction CD2. To transition from the configuration of FIG. 15A to the configuration of FIG. 15B, selector ring 106 and spring 108 have been rotated, with respect to ring 102 and pawls 110, in circumferential direction CD2. As a result, portions 144 of spring 108 are disposed in respective grooves 124, and ends 112 are urged radially inward. For example, portion 144A is disposed in groove 124A and end 112A is urged radially inwardly. Rotation of ring 102 with respect to ring 104 in direction CD2, brings ends 112 into contact with surfaces 150. For example, end 112A is in contact with surface 150A. Stop 164A has contacted end 160A to prevent ring 106 from over rotating into the free-wheel or first clutch mode. That is, when stops 164 contact ends 160, portions 144 are located in respective grooves 124, ensuring proper implementation of the second clutch mode. In an example embodiment, for rotation of ring 102, with respect to ring 104, in direction CD2, ends 112 are tipped into contact with ramps 154 and slide down ramps 154 to contact surfaces 150. Radially inward force from spring 108 keeps ends 112 in contact with surfaces 150. In an example embodiment, for rotation of ring 102, with respect to ring 104, in circumferential direction CD1, ends 112 slide up ramps 154 and over surfaces 148.

Once clutch 100 is in the first or second clutch mode, rings 102 and 104 are non-rotatably connected for rotation of ring 104 in directions CD1 and CD2, respectively. However: to transition from the free-wheel mode or the first clutch mode to the second clutch mode, ring 102 rotates in direction CD1 with respect to ring 104, until ends 114 contact and lock with inner ring 104; and, to transition from the free-wheel mode or the second clutch mode to the second clutch mode, ring 102 rotates in direction CD2 with respect to ring 102, until ends 112 contact and lock with the inner ring.

Advantageously, clutch 100 is controllable to select from a multitude of example operating modes as shown below:
6. The free-wheel mode described above.
7. The first clutch mode described above.
8. The second clutch mode described above.
9. A first grounded clutch mode: Ring 104 is rotationally fixed (grounded); and ring 106 and spring 108 are rotated, with respect to ring 102, to locate portions 144 in respective grooves 124 for pawls 110. Rotation of ring 102 in direction CD2 is blocked by contact of ends 112 with surfaces 150. Ring 102 is free to rotate in direction CD1.
10. A second grounded clutch mode: Ring 102 is rotationally fixed (grounded); and ring 106 and spring 108 are rotated, with respect to ring 102, to locate portions 144 in respective grooves 126 for pawls 110. Rotation of ring 102 in direction CD1 is blocked by contact of ends 114 with surfaces 152. Ring 102 is free to rotate in direction CD2.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:
1. A three-way switchable clutch, comprising:
a first ring;
a second ring radially offset from the first ring;
a wave spring; and,
a plurality of pawls, each pawl:
    connected to the first ring; and,
    engaged with the wave spring, wherein for a free-wheel mode of the three-way switchable clutch, the first ring and the second ring are rotatable with respect to each other; wherein for a first clutch mode of the three-way switchable clutch, the wave spring is arranged to displace the plurality of pawls to contact the second ring, preclude relative rotation of the first ring with respect to the second ring in a first circumferential direction, and enable relative rotation of the first ring with respect to the second ring in a second circumferential direction, opposite the first circumferential direction; and wherein for a second clutch mode of the three-way switchable clutch, the wave spring is arranged to displace the plurality of pawls to contact the second ring, preclude relative rotation of the first ring with respect to the second ring in the second circumferential direction, and enable relative rotation of the first ring with respect to the second ring in the first circumferential direction.

2. The three-way switchable clutch of claim 1, wherein for the free-wheel mode, the plurality of pawls is free of contact with the first ring.

3. The three-way switchable clutch of claim 1, further comprising:
a selector ring radially disposed between the first ring and the second ring, wherein for the first clutch mode, the first ring and the second ring are non-rotatably connected for rotation of the first ring in the first circumferential direction; wherein for the second clutch mode, the first ring and the second ring are non-rotatably connected for rotation of the first ring in the second circumferential direction; wherein to shift from the free-wheel mode to the first clutch mode, the selector ring is arranged to displace, with respect to the second ring, in the second circumferential direction; and wherein to shift from the free-wheel mode to the second clutch mode, the selector ring is arranged to displace, with respect to the second ring, in the first circumferential direction.

4. The three-way switchable clutch of claim 1, further comprising:
a selector ring engaged with the wave spring, wherein said each pawl includes a first end extending furthest in the second circumferential direction, and a second end extending furthest in the first circumferential direction; wherein for the first clutch mode, the wave spring is arranged to urge the first ends radially inwardly to contact the first ring; and wherein for the second clutch mode, the wave spring is arranged to urge the second ends radially inwardly to contact the first ring.

5. The three-way switchable clutch of claim 4, wherein said each pawl includes a first groove, a second groove circumferentially disposed between the first groove and the first end, and a third groove circumferentially disposed between the first groove and the second end; wherein for the first clutch mode, respective portions of the wave spring are disposed in the second grooves; and wherein for the second clutch mode, the respective portions of the wave spring are disposed in the third grooves.

6. The three-way switchable clutch of claim 4, wherein the first ring includes a plurality of locking ramp groups, each locking ramp group with a radially outermost surface, a first blocking surface extending radially inwardly from the radially outermost surface, and a second blocking surface extending radially inwardly from the radially outermost surface; wherein for the first clutch mode, said each pawl is arranged to contact a respective first blocking surface; and wherein for the second clutch mode, said each pawl is arranged to contact a respective second blocking surface.

7. The three-way switchable clutch of claim 6, wherein each locking ramp group includes a first ramp sloping radially outward from the first blocking surface in the first circumferential direction, and a second ramp sloping radially outward from the second blocking surface in the second circumferential direction; wherein for the first clutch mode, said each pawl is arranged to slide radially inwardly along a respective first ramp to contact the first blocking surface; and wherein for the second clutch mode, said each pawl is arranged to slide radially inwardly along a respective second ramp to contact the second blocking surface.

8. The three-way switchable clutch of claim 1, wherein the second ring includes a slot opening radially inwardly said each pawl includes a groove and a head portion disposed in the slot, and said each pawl is pivotable, with respect to the second ring, about an axis parallel to an axis of rotation of the three-way switchable clutch and passing through the head portion; and wherein for the free-wheel mode, a plane, co-linear with the axis of rotation, passes through a radially innermost portion of the wave spring, the groove in a first pawl, and the axis for the first pawl.

9. The three-way switchable clutch of claim 1, wherein the second ring is located radially outward of the first ring, and the wave spring is radially disposed between the first ring and the second ring.

10. A three-way switchable clutch, comprising:
an axis of rotation;
an outer ring;
an inner ring located radially inwardly of the outer ring;
a selector ring located radially between the inner and outer rings;
a wave spring non-rotatably connected to the selector ring; and,
a plurality of pawls, each pawl:
including first and second circumferential ends; and,
engaged with the wave spring, wherein for a free-wheel circumferential position of the selector ring, the inner ring and outer rings are rotatable with respect to each other;
wherein for a first circumferential position of the selector ring, the wave spring is arranged to displace the first circumferential ends radially inwardly to contact the inner ring and non-rotatably connect the inner and outer rings for rotation of the inner ring in a first circumferential direction, and the inner ring is rotatable, with respect to the outer ring, in a second circumferential direction, opposite the first circumferential direction; and
wherein for a second circumferential position of the selector ring, the wave spring is arranged to displace the second circumferential ends radially inwardly to contact the inner ring and non-rotatably connect the inner and outer rings for rotation of the inner ring in the second circumferential direction and the inner ring is rotatable, with respect to the outer ring, in the first circumferential direction.

11. The three-way switchable clutch of claim 10, wherein the outer ring includes a plurality of slots opening radially inwardly, said each pawl includes a head portion disposed within a respective slot, the head portion is radially and circumferentially fixed with respect to the outer ring, and said each pawl is pivotable, with respect to the outer ring, about an axis passing through the head portion and parallel to the axis of rotation; and wherein to transition among the free-wheel circumferential position, the first circumferential position and the second circumferential position, the selector ring and the wave spring are arranged to pivot said each pawl about the axis.

12. The three-way switchable clutch of claim 10, wherein the selector ring is displaceable, with respect to the outer ring, in the first circumferential direction to transition from the first circumferential position to the free-wheel and second circumferential positions; and wherein the selector ring is displaceable, with respect to the outer ring, in the second circumferential direction to transition from the second circumferential position to the free-wheel circumferential position and first circumferential positions.

13. A three-way switchable clutch, comprising:
an axis of rotation;
an outer ring;
an inner ring located radially inwardly of the outer ring;
a selector ring located radially between the inner and outer rings;
a wave spring non-rotatably connected to the selector ring; and,
a plurality of pawls, each pawl:
including first and second circumferential ends; and,
engaged with the wave spring, wherein for a free-wheel circumferential position of the selector ring, the inner ring and outer rings are rotatable with respect to each other;
wherein for a first circumferential position of the selector ring, the wave spring is arranged to displace the first circumferential ends radially inwardly to contact the inner ring and non-rotatably connect the inner and outer rings for rotation of the outer ring in a first circumferential direction, and the outer ring is rotatable, with respect to the inner ring, in a second circumferential direction, opposite the first circumferential direction; and
wherein for a second circumferential position of the selector ring, the wave spring is arranged to displace the second circumferential ends radially inwardly to contact the inner ring and non-rotatably connect the inner and outer rings for rotation of the outer ring in the second circumferential direction, and the outer ring is rotatable, with respect to the inner ring, in the first circumferential direction.

14. The three-way switchable clutch of claim 13, wherein the outer ring includes a plurality of slots opening radially inwardly, said each pawl includes a head portion disposed within a respective slot, the head portion is radially and circumferentially fixed with respect to the outer ring, and said each pawl is pivotable, with respect to the outer ring, about an axis passing through the head portion and parallel to the axis of rotation; and wherein to transition among the free-wheel circumferential position, the first circumferential position and the second circumferential position, the selector ring and the wave spring are arranged to pivot said each pawl about the axis.

15. The three-way switchable clutch of claim 13, wherein the selector ring is displaceable, with respect to the outer ring, in the second circumferential direction to transition from the first circumferential position to the free-wheel and second circumferential positions; and wherein the selector ring is displaceable, with respect to the outer ring, in the first circumferential direction to transition from the second circumferential position to the free-wheel position and first circumferential position.

* * * * *